US008261240B2

(12) United States Patent
Hoban et al.

(10) Patent No.: US 8,261,240 B2
(45) Date of Patent: Sep. 4, 2012

(54) DEBUGGING LAZILY EVALUATED PROGRAM COMPONENTS

(75) Inventors: Lucas Hoban, Seattle, WA (US);
Sreekar Choudhary, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 12/014,097

(22) Filed: Jan. 15, 2008

(65) Prior Publication Data
US 2009/0183142 A1      Jul. 16, 2009

(51) Int. Cl.
G06F 9/44            (2006.01)
(52) U.S. Cl. ........................... 717/125; 717/124
(58) Field of Classification Search .......... 717/124–135; 714/37, 38.1
See application file for complete search history.

(56) References Cited

U.S. PATENT DOCUMENTS

| | | | |
|---|---|---|---|
| 6,366,920 B1 | 4/2002 | Hoose et al. | |
| 6,564,223 B1* | 5/2003 | Sexton et al. ................. | 1/1 |
| 6,665,648 B2 | 12/2003 | Brodersen et al. | |
| 6,842,905 B2 | 1/2005 | Knutson et al. | |
| 6,970,975 B2 | 11/2005 | Frank | |
| 7,003,732 B1 | 2/2006 | Zhaksilikov et al. | |
| 7,043,481 B2 | 5/2006 | Mullins et al. | |
| 7,072,919 B2* | 7/2006 | Sexton et al. ................. | 1/1 |
| 7,117,507 B2* | 10/2006 | Hostetter et al. ............. | 719/331 |
| 7,158,995 B2* | 1/2007 | Sexton et al. ................. | 1/1 |
| 7,237,085 B2* | 6/2007 | Sexton et al. ................. | 711/221 |
| 7,249,235 B2* | 7/2007 | Sexton et al. ................. | 711/165 |
| 7,281,017 B2* | 10/2007 | Hostetter et al. ............. | 1/1 |
| 8,087,002 B2* | 12/2011 | Fjeldstad et al. ............. | 717/124 |
| 2004/0205587 A1 | 10/2004 | Draper | |
| 2004/0210882 A1* | 10/2004 | Takeuchi ................. | 717/141 |
| 2004/0230954 A1 | 11/2004 | Dandoy | |
| 2005/0172168 A1* | 8/2005 | Kilian ................. | 714/31 |
| 2005/0216893 A1 | 9/2005 | Horton et al. | |
| 2005/0246690 A1 | 11/2005 | Horton et al. | |
| 2007/0027849 A1 | 2/2007 | Meijer et al. | |
| 2007/0250819 A1* | 10/2007 | Fjeldstad et al. ............. | 717/129 |
| 2008/0098372 A1* | 4/2008 | Takeuchi ................. | 717/142 |

OTHER PUBLICATIONS

Jorgensen, Jesper, "Generating a Compiler for a Lazy Language by Partial Evaluation," 1992, ACM, p. 258-268.*
Naish, Lee, "Declarative debugging of lazy functional programs," Jun. 1992, p. 1-13.*
Sparud, Jan, "A transformational Approach to Debugging Lazy Functional Programs," Jan. 1996, p. 1-60.*
Petricek, Tomas, "Lazy Computation in C#," Oct. 2007, [http://msdn.microsoft.com/en-us/vcsharp/bb870976], p. 1-4.*
Henderson et al., "A Lazy Evaluator," 1976, ACM, p. 95-103.*
Nilsson et al., "Lazy Algorithmic Debugging: Ideas for Practical Implementation," 1993, p. 117-134.*

(Continued)

Primary Examiner — Wei Zhen
Assistant Examiner — Qing Chen
(74) Attorney, Agent, or Firm — Gary Mager

(57) ABSTRACT

A system and method for facilitating debugging of a computer program is provided. Mechanisms of the present invention facilitate presenting information and enable a developer to interact with a lazily evaluated program component. A debugging system may display data associated with a lazily evaluated program component, and may enable the programmer to control evaluation and viewing of elements of the lazily evaluated program component. In response to a user command, a debugging system may evaluate elements of the program component and display associated data. A user interface enables a user to view, interact with, and debug lazily evaluated program components as well as a program containing such components.

18 Claims, 10 Drawing Sheets

OTHER PUBLICATIONS

Chitil et al., "Freja, Hat and Hood—A Comparative Evaluation of Three Systems for Tracing and Debugging Lazy Functional Programs," 2001, Springer-Verlag, p. 176-193.*
Ennals et al., "HsDebug : Debugging Lazy Programs by Not Being Lazy," Aug. 2003, ACM, p. 84-87.*
Marlow et al., "A Lightweight Interactive Debugger for Haskell," Sep. 2007, ACM, p. 13-24.*
Braβel et al., "Lazy Call-By-Value Evaluation," Oct. 2007, ACM, p. 265-276.*
"Sree's ventures in code space, Debugging Features in C# 3.0 Part 1", Sep. 26, 2007, pp. 1-4.
"Pedram Rezaei's Ramblings-Lazy evaluation in C#", Sep. 18, 2007, pp. 1-4.
"Eric White's Blog : Lazy Evaluation (and in contrast, Eager Evaluation)", Sep. 18, 2007.
Spaanjaars, Imar, "Building Layered Web Application with Microsoft ASP.NET 2.0—Part 2", Retrieved at <<http://imar.spaanjaars.com/QuickDocId.aspx?quickdoc=419>>, downloaded Apr. 2, 2012, portions dated Apr. 25, 2007, pp. 1-21.
"Followup! 1.4", Retrieved at <<http://www.filetransit.com/view.php?id=5038", downloaded Apr. 2, 2012, originally downloaded prior to Jan. 14, 2008, p. 1.
California Institute of Technology, "CS 11 Haskell track: lecture 1", Retrieved at <<http://courses.cms.caltech.edu/cs11/material/haskell/lectures/haskell_lecture_1.pdf, downloaded Apr. 2, 2012, original version downloaded prior to Jan. 14, 2008, pp. 1-52.

* cited by examiner

DEBUGGING LAZILY EVALUATED PROGRAM COMPONENTS

TECHNICAL FIELD

The present invention relates generally to computer systems, and, more particularly, to debugging of computer processes.

BACKGROUND

The development of computer software generally includes the verification, testing, or correction of computer code or hardware. A debugger is a program or process that allows a developer to observe a computer process as it executes or at breaks during the execution. Typically, a debugger uses a graphical user interface to present data to a developer and to allow a developer to manipulate a program being inspected. Debuggers may allow a developer to execute portions of a program or step through the execution of a program. A developer may set breakpoints or break conditions that specify where or under what conditions a program is to pause operation. A debugger may allow a developer to observe a process flow through the program instructions, to examine run-time data relating to the executing process, such as the values of variables, content of memory locations, states of various objects or structures, and the like. This information may help a developer to determine whether data is within acceptable parameters, whether the program is executing efficiently or correctly, as well as other aspects useful to the development or correction of computer code or hardware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, user interface, and components operate to facilitate debugging of a computer program. A method for such purpose may include one or more actions to enable a user to view program data, control execution of a computer program, and selectively perform deferred expression evaluation. These actions may, but do not necessarily include actions of executing a program that contains one or more program components, determining whether a program component is a lazily evaluated (LE) component, and, if so, performing additional actions related to the LE component. The additional actions may include presenting to the user a display that indicates a deferred evaluation is associated with the LE component, enabling a user to issue a command to force the evaluation of the LE component, and, in response to receiving such a command, evaluating the LE component and displaying results of the evaluation. The evaluation may be complete or incomplete, depending on configurations, user actions, program logic, or other factors. More specifically, the evaluation may be terminated before completion due to any one or more of a specified timeout period expiring, a user command to cancel the evaluation, an error occurring during the evaluation, or other factors.

Various configurations may allow for various ways of determining whether a component is an LE component. One way tests whether the component is an iterator object, whether it is not a concrete collection, and whether the component does not have an associated display proxy. If all three tests are affirmative, the component may be considered an LE component. However, one or more other tests may be used in place of these tests, or in combination with any of them. In some configurations, having an associated display proxy may exclude the component from being considered to be an LE component, though in other configurations, an object having an associated display proxy may be considered to be an LE component. In the latter configurations, a user interface may use instructions from the display proxy when presenting LE component data.

A user interface that presents LE component data to a user may display the data in a hierarchical structure. In such a structure, a deferred evaluation may be represented by an expandable node at one level, while elements resulting from the evaluation may be represented by respective child nodes at a lower level. The expandable node may be initially presented as unexpanded, enabling a user to expand the node. In response to the user command to expand, the debugger may proceed to enumerate the elements of the deferred evaluation. Various other user interfaces may also be employed to provide similar information and functions.

Another aspect of a debugging system may enable a user to single step, continue, or otherwise resume execution of a computer program after evaluating an LE object at a breakpoint. In response to a resume command, the debugger may prevent undesirable expression evaluation or enumeration of child elements by disabling automatic evaluation of the LE object. The UT may provide an indication that displayed data is stale in conjunction with resuming program execution. The debugging system may provide a mechanism for refreshing one or more stale elements of the LE object.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components may execute from various computer readable media having various data structures thereon. The components may communicate via local or remote processes such as in accordance with a signal having one or more data packets (e.g. data from one component interacting with another component in a local system, distributed system, or across a network such as the Internet with other systems via the signal). Computer components may be stored, for example, on computer readable media including, but not limited to, an application specific integrated circuit (ASIC), compact disk (CD), digital versatile disk (DVD), read only memory (ROM), floppy disk, hard disk, electrically erasable programmable read only memory (EEPROM), flash memory, or a memory stick in accordance with embodiments of the present invention.

Figure 1:
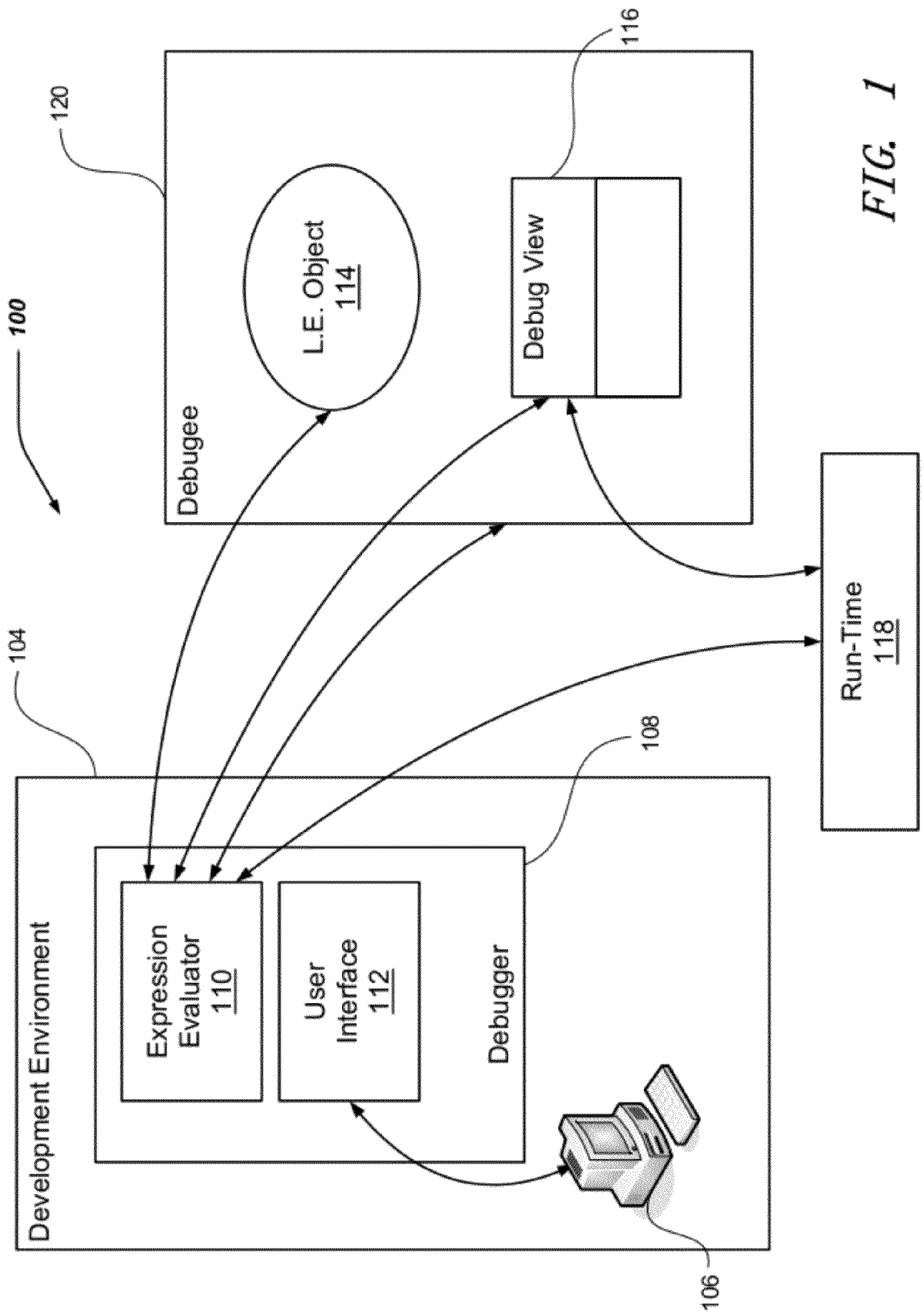
FIG. 1 shows one embodiment of a system implementing aspects of the present invention.

Prior to a description of FIG. 1, a discussion of lazy evaluation and deferred queries is now provided. Lazy evaluation refers to a concept in computer programs in which evaluation of an expression is deferred until it is required by the program. A compiler may include with the program data or instructions corresponding to the expression that enables the run-time system to evaluate the expression at the time when the evaluation is required, rather then when the program flow reaches the expression. Lazy evaluation is also referred to herein as deferred evaluation. As used herein, the term lazily evaluated object, or LE object, refers to an object that is lazily evaluated, and may refer to the object before or after the lazy evaluation. The compiler may include a pattern or instructions that are employed at run-time to retrieve each element resulting from the evaluation. For these objects, when the LE object is instantiated, the data of each element is not generated or retrieved, or not completed, until the data is required.

In some programming languages, such as C#, an object that is an instance of a class of iterators, or implements the iterator pattern may, with some exceptions, employ lazy evaluation. Such an object may be referred to as an iterator object or an enumerable object. For an iterator object, which may include multiple elements, evaluation of each element may be delayed until the particular enumeration is required. A method may be employed to access the current element or move to the next element of the enumerable object. For example, an enumeration may include a very large, or even an infinite number, of elements, and each one is evaluated as required. In the C# language, the IEnumerable interface implements the Iterator Pattern, and allows for the creation of a collection that can be enumerated. In the IEnumerable interface, the MoveNext method iterates over each element. The IEnumerable interface can create an enumeration having lazy evaluation.

However, some iterator objects are concrete collections, and therefore are not lazily evaluated. A concrete collection includes a known collection of objects in memory, and does not need an additional evaluation to enumerate the objects. Arrays, lists, and strings are examples of concrete collections to which lazy evaluation does not apply. Concrete collections are indexable. In a concrete collection, the object includes the data itself, rather than a pattern indicating how the data is to be retrieved. In some programming languages, the set of iterator objects that are not concrete collections are LE objects, though there may be other LE objects that do not implement the iterator pattern. In the C# language, the set of iterator objects that are not concrete collections are LE objects, but do not necessarily represent all LE objects. More specifically, in the C# language, an object that implements the IEnumerable interface is an iterator object, and an object that implements the IList or ICollection interface is a concrete collection. Various languages may have similar or different semantics with respect to the specification of LE objects.

Deferred queries are a particular type of LE object that represent query operations over one or more data sources, such as external databases. The data sources may be local, on the same computing device as the debugger, or remotely located, such as on a local area network, a wide area network, or across another type of remote communication. In the C# language, a query can be wrapped in the IEnumerable interface to create a deferred query. As used herein, the term lazy evaluation includes deferred queries, and LE objects include deferred query objects.

It should be noted that objects may contain various member objects, and a determination that an object is not an LE object does not indicate whether its member objects are LE objects. For example, an iterator object X that is an array of objects of type Y may be determined to not be an LE object, but each object of type Y may be an LE object. In one implementation, the object X may be presented at a first level in a hierarchical display, each object Y may be presented as a child node at a second level, and forcing evaluation of any one of the child objects results in an evaluation of the child object and display of the results at a third level.

FIG. 1 is a block diagram of a debugging system 100, in accordance with some aspects of the present invention. Debugging system 100 is only one example of a suitable system and is not intended to suggest any limitation as to the scope of use or functionality of the present invention. Thus, a variety of system configurations may be employed without departing from the scope or spirit of the present invention.

As shown in the figure, debugging system 100 includes a development environment 104, which may be employed by a program developer during the development, testing, or debugging of a program. The development environment 104 may include one or more client computers, such as computing device 106, which may be used to execute, observe, or debug a computer program.

The term computing device encompasses servers, personal computers, laptop computers, handheld computers, PDAs, handheld computers, cell phones, smart phones, or other computing devices having one or more processors.

In brief, one embodiment of a computing device that may be employed includes one or more central processing units (CPU), a video display adapter, and a mass memory, all in communication with each other via a bus. The mass memory may include a random access memory (RAM), a read only memory (ROM), one or more permanent mass storage devices, removable media, or a combination thereof. Mass storage devices may include a hard disk drive, optical drive, flash memory, or a floppy disk drive. The mass memory may include a general-purpose operating system, application programs, security programs, communication programs, or other computer programs. The computer programs may include a compiler, an interpreter, a debugger, version control software, or other software used to develop computer programs.

One embodiment of a computing device may include a network interface unit, drivers, or other software for communicating with remote devices. The computing device may employ one or more of various wired or wireless communication protocols, such as IP, TCP/IP, UDP, HTTP, SSL, WAP, Bluetooth, or the like. Communications may use direct connections, local area networks, wide area networks such as the Internet, wireless networks, or a combination thereof.

Development environment 104 may include a debugger 108. As illustrated, debugger 108 may include an expression evaluator (EE) 110 and a user interface (UT) 112. The user interface may include or control a visual display that is presented to the developer on computing device 106, as well as an interface that allows a developer to provide input and manipulate objects, such as by using a keyboard, a pointing device, voice commands, or any other input mechanism. In one embodiment, the UT 112 includes an audio interface that presents audio to the developer. UT 112 may include software that communicates with and controls hardware components, or it may be a combination of hardware and software.

Briefly, the expression evaluator 110 evaluates expressions associated with one or more computer languages. For example, each of the computer languages C#, Visual Basic, J#, C++, Java, or other computer languages may have a unique corresponding EE, or an EE may be associated with multiple languages. The EE 110 may receive data corresponding to a program object and facilitate organizing and displaying appropriate data to a developer. Further operating details of the EE 110 are provided herein.

Debugging system 100, as illustrated in FIG. 1, further includes a debuggee program 120. Debuggee 120 may be a computer program, a process, a thread of execution, or a portion or combination thereof that is the target of the debugging mechanisms. As used herein, the term debuggee program may refer to any of these program elements. For much of the description herein, discussions of debuggee 120 may refer to a single process, but the mechanisms of the debugging system are not so limited, and are not to be considered so limited unless clearly stated otherwise.

Debuggee 120 may include one or more program components, such as object 114 and a debug view component 116. Program objects are well-known in object-oriented languages such as C# or Visual Basic. Objects generally have associated code and data. The data may include static data or dynamic data of a variety of types. In particular, object 114 is a lazily evaluated (LE) object.

Debug view component 116 is a component that is associated with LE object 114, and provides information or instructions to facilitate presenting a view of the LE object 114. In one implementation, debug view component 116 may be a program object, though in other implementations, debug view component may include instructions or data in a variety of forms. Debug view component 116 may include one or more subcomponents that correspond to different types of LE object 116, and facilitate views of object 116 based on its type. For example, a debug view component may have a subcomponent that corresponds to generic types, and another subcomponent that corresponds to a special type. Debug view component 116 may specify elements of LE object 114 that are to be displayed or not displayed. Debug view components may be provided by a programmer, the debugging system, external libraries, or other sources. In one implementation, debug view component 116 may be a proxy object that functions as a proxy for LE object 114 for purposes of viewing in a debugger. For example, in response to a request to examine LE object 114, debugger 108 may create a proxy object associated with LE object 114, communicate with the proxy object, and display attributes or data of the proxy object, thereby displaying an indirect representation of LE object 114. Debug view component 116 may present an interface to the debugger that hides selected data, such as local variables, from display, or otherwise modifies default mechanisms for displaying data of LE object 114. As discussed herein, at least some mechanisms of the invention may be used in combination with a display proxy object, or may be used as an alternative to a display proxy object, based on system configurations.

In one embodiment, debugger 108 and debuggee 120 are separate processes. They may communicate via I/O streams. For example, data describing objects or the run-time contents of object elements may be sent to the debugger 108 by serializing the data and sending the data over a stream to the debugger 108. Debugger 108 and debuggee 120 may reside or execute on a single computing device, such as computing device 106, on different computing devices, or may be distributed among multiple computing devices. The computing devices may communicate with each other locally or remotely over a network.

As illustrated in FIG. 1, a debugging system 100 may further include a run-time environment 118. Run-time environment 118 corresponds to debuggee 120 and includes various data specified in debuggee 120 as well as data for executing a process. This may include any combination of a run-time stack, a memory heap, registers, run-time library objects, a run-time linker, interfaces with various external components, and the like.

As illustrated in FIG. 1, in a debugging system such as debugging system 100, an expression evaluator 110 may communicate with one or more of debuggee 120, LE object 114, debug view component 116, or run-time environment 118. For example, EE 110 may receive from run-time environment 118 an indication of a current instruction being executed or just executed. EE 110 may then request and receive from debuggee 120 information for displaying the current instruction, such as the instruction source code. EE 110 may receive from LE object 114 data describing the object type, as well as metadata describing the object. EE 110 may further received from debug view component 116 information or instructions indicating which data associated with the LE object 114 is to be displayed, and how it is to be displayed.

Figure 10:
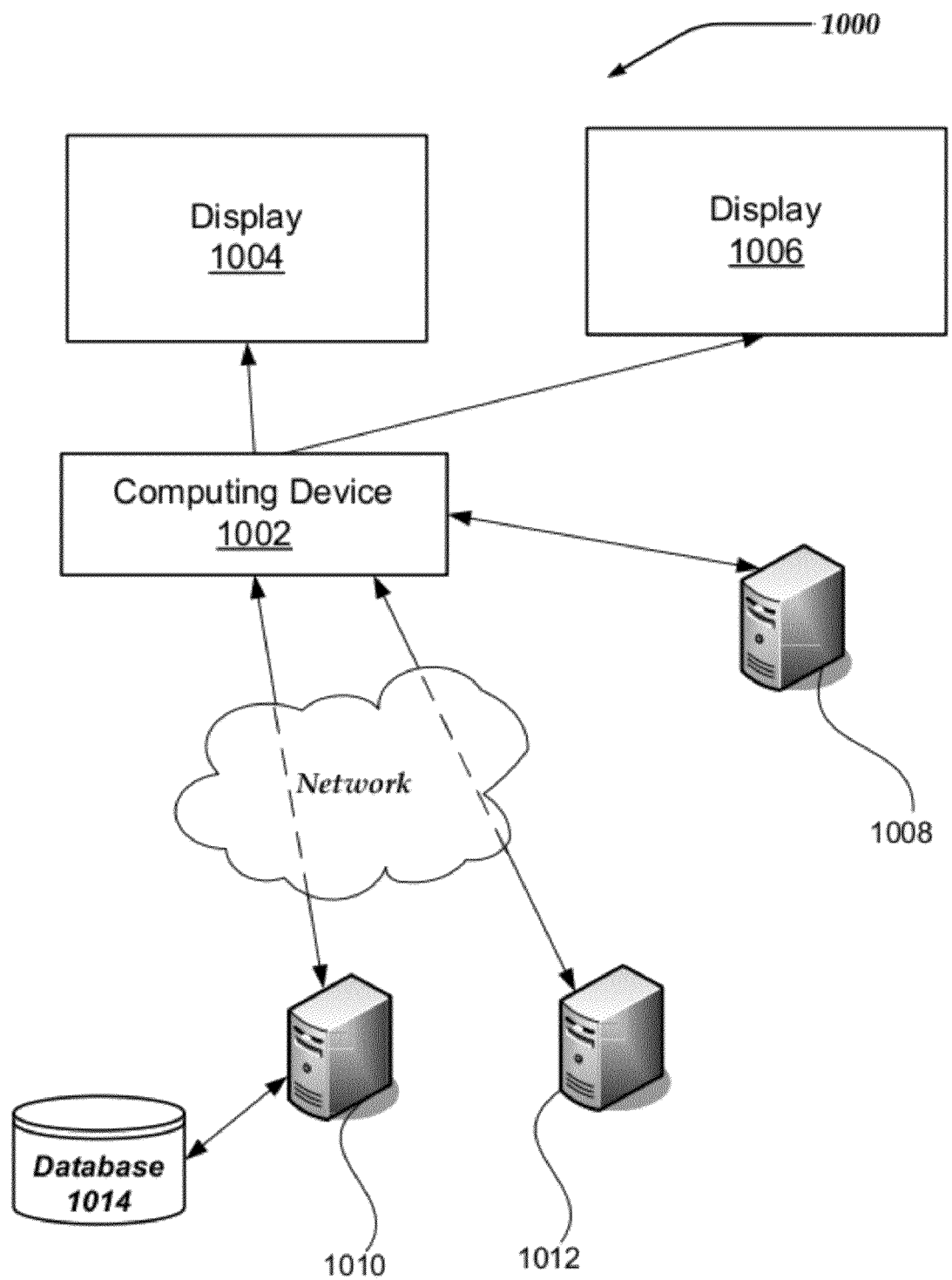
FIG. 10 illustrates an example operating environment in which embodiments of the invention may function.

In some configurations, a query used to force the evaluation of an LE object may be directed to one or more remote computing devices. Debugging system 100, and in particular, run-time component 118, may be in communication with these remote computing devices, directly or indirectly. Remote computing devices may include a data store, such as a database from which information is retrieved in response to the query. FIG. 10 illustrates an exemplary environment having remote computing devices that may be used to evaluate deferred queries.

Figure 2:
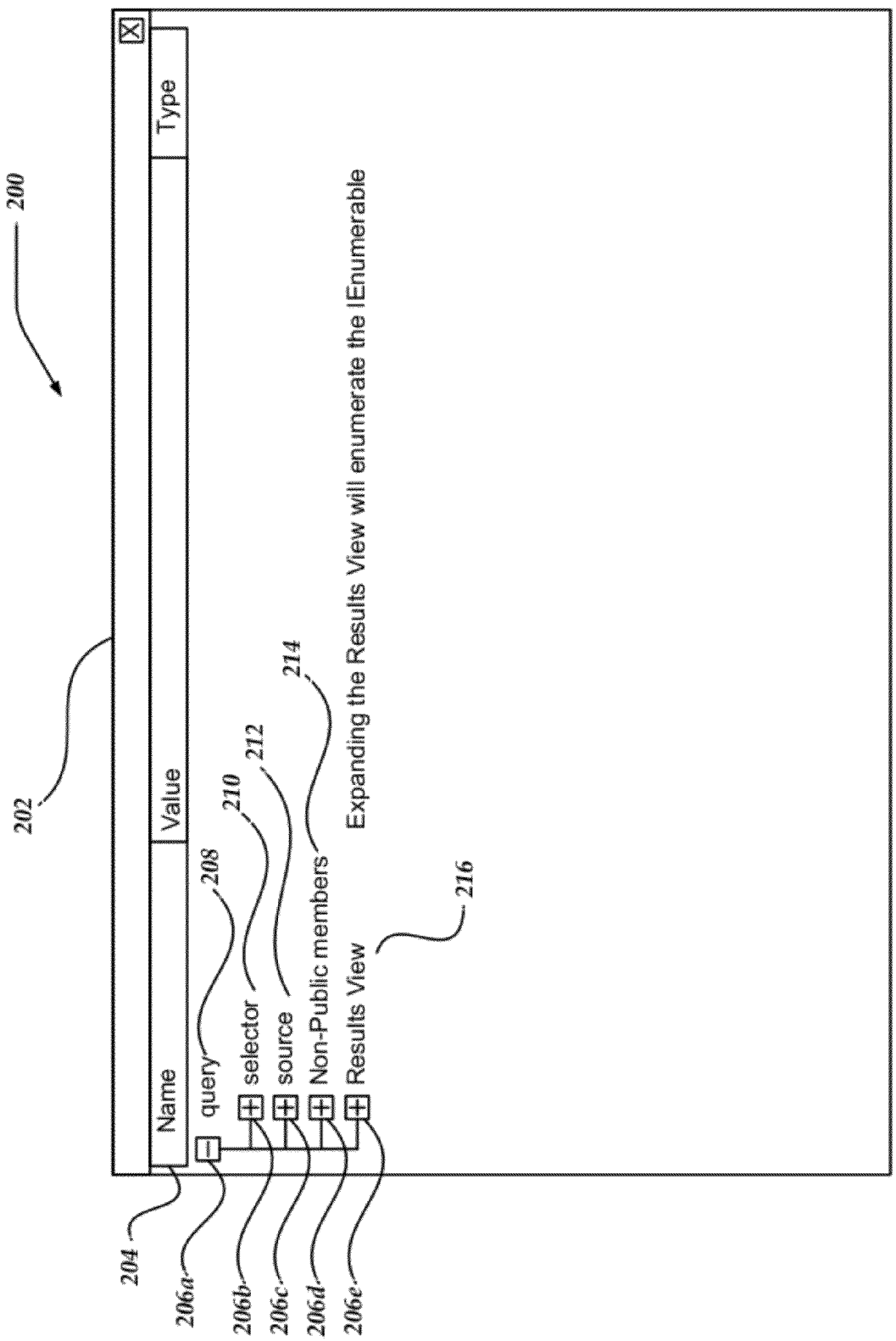
FIG. 2 illustrates an example display as part of a user interface for presenting data that may be used in one embodiment of the present invention.

FIG. 2 illustrates an example display 200 as part of a user interface for presenting data related to a lazily evaluated object, in accordance with an aspect of the present invention. The display 200 includes a window 202 that contains object data. The window 202, or the contents therein, or a portion thereof, may be presented to a user automatically during execution of a debuggee program, such as debuggee 120 of FIG. 1, or in response to a user command to display the data therein. A user may enter the command by selection of a menu item, an icon, keyboard or mouse input, voice commands, or the like. In one implementation, a user may specify that a "watch" window is created, and associate the object to be displayed with the watch window. The watch window may include the data illustrated in FIG. 2, or a portion thereof. In one embodiment, the window 202 is a watch window. In one implementation, the contents of FIG. 2, or a portion thereof, may be included in a window that displays variables in scope when a debuggee program breaks, or in a temporary window that appears in response to a user causing a pointer to hover over an object displayed in source code, a list of objects, or in another manner. In one embodiment, more than one window containing at least portions of the data related to the object may be displayed concurrently. In one embodiment, portions of the data may be displayed on different monitors communicating directly or indirectly with the user's computer, or on monitors communicating over a network. The display monitor may be geographically separated from the processor executing the debuggee program.

As illustrated in FIG. 2, a debugging window 202 may include a display of one or more data items, or nodes. Each node is a component in a tree structure. FIG. 2 illustrates nodes presented as rows in a table format; however the invention is not so limited. The nodes may be presented as columns, blocks of data, graphical figures, or another display interface.

In the example illustrated by FIG. 2, each of the nodes 208-216 is a node in a tree structure. The tree structure is indicated by horizontal and vertical lines connected with a set of node expansion icons 206a-e, including a root node expansion icon 206a. A node expansion icon displaying a plus symbol ("+") indicates that the node can be expanded in the display. A node expansion icon displaying a minus symbol ("−") indicates that the node is expanded, or that there is no expansion corresponding to the node, in the display. A user may enter commands to toggle a node between an expanded and an unexpanded state. For example, in one implementation, clicking on a node expansion icon causes a toggling of state. Selecting a node and selecting a menu command, or a keyboard command, or other types of commands may be used to toggle each node state.

A header row 204 may include a name header, a value header, and a type header, each referring to corresponding fields in the nodes that follow. In some embodiments, field names may hidden at times, indicated in a different manner, or may be implicit by positioning, formatting, or in other ways.

Root node 208 includes fields related to the LE object being inspected. The name of the object as illustrated is "query."

Nodes 210-214 include data of the LE object. This may include public or private data or properties. In the example display illustrated by FIG. 2, each of nodes 210-214 is expandable. Expanding each of them displays child nodes and their respective names and values.

Results view node 216 includes a label "Results View" in the name field. This label is a place-holder for results of an evaluation of the LE object. As indicated by the node expansion icon 206e corresponding to results view node 216, this expandable node represents an unexpanded view of the LE object, and indicates to a user that the view can be expanded, and the corresponding results displayed, which may include enumerating elements, by a user command, as described above.

Results view node 216 further includes a notice displayed in the value field. The example notice illustrated in FIG. 2 includes the text "Expanding the results view will enumerate the IEnumerable." This notice indicates to the user that, in response to expanding the results view node, the debugger may change the state of the LE object by forcing its evaluation. More specifically, for an enumerable LE object, the notice indicates that the debugger will iterate over each item of the LE object, causing the corresponding expression to be evaluated during each enumeration. The notice further provides notice to a user that the enumeration may result in a large amount of data being retrieved and displayed, a lengthy amount of time being taken to evaluate and retrieve the data, or a significant amount of other resources, such as memory, to be consumed. Having knowledge of the debuggee program and various resources, a user may then make an informed decision as to whether to proceed with the object enumeration. In one configuration, a warning notice may have the text "Expanding the results view will force evaluation of the object," indicating that the debugger will evaluate the LE object, which may, but not necessarily, include enumerating elements of the object.

The notice further indicates to the user that the evaluation of the LE object may cause changes in the related data, and that these changes may consume resources or cause side effects, altering the program flow or otherwise altering the results of executing the debuggee program. In one example, evaluation of an LE object may cause one or more database queries, and each query may cause an increment of a counter. Changing the counter value by debugger actions may alter the flow or results of the program, so that program execution or results may differ from what they would be if the program were not executed with the debugger, or if the LE objects were not evaluated in the debugger. This mechanism therefore provides the user with a way to decide whether to force evaluation of an LE object. The user may employ knowledge of the program logic, as well as query execution, together with the debugging task at hand to decide whether to force evaluation of the LE object.

Figure 3:
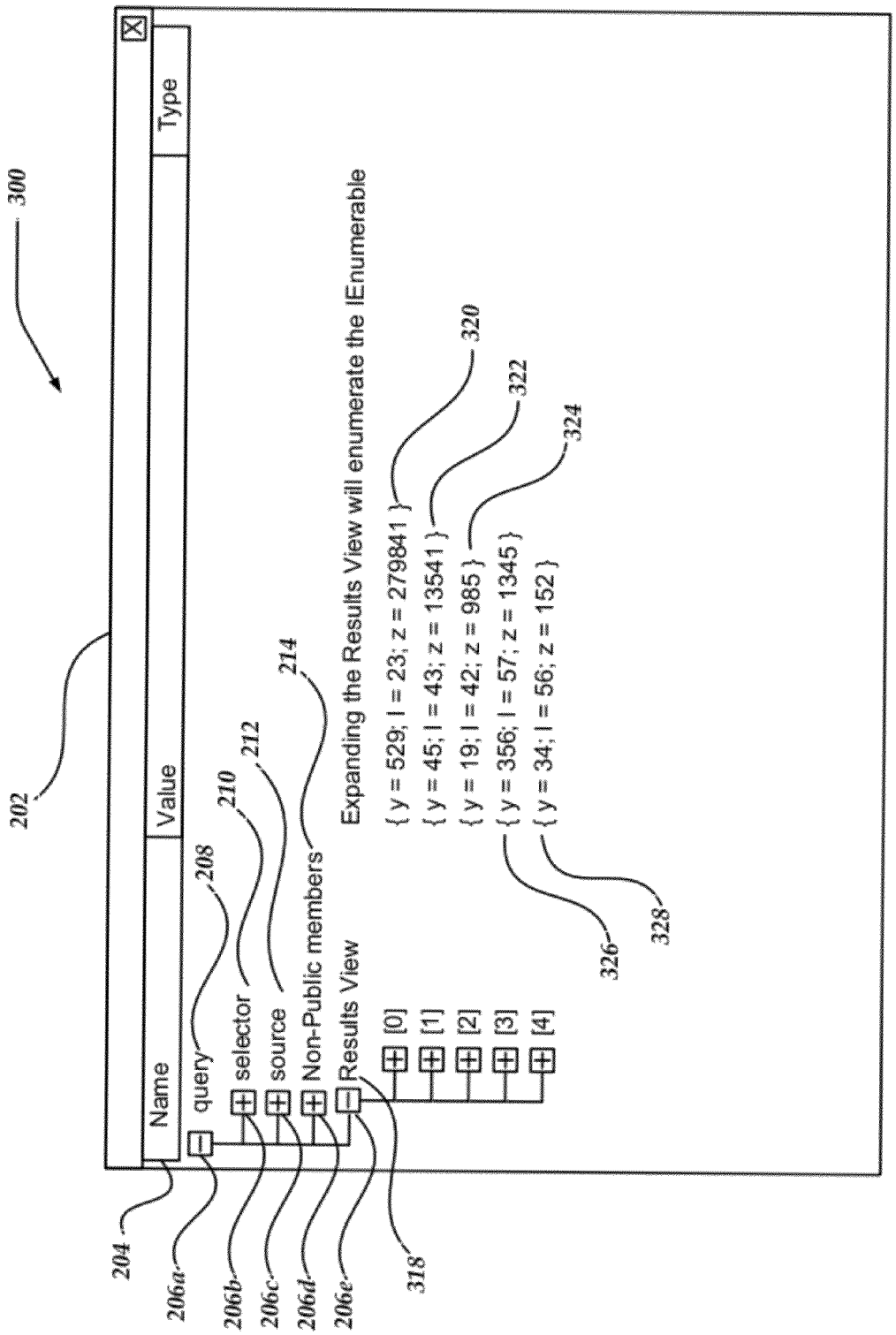
FIG. 3 illustrates another example display as part of a user interface for presenting data that may be used in one embodiment of the present invention.

FIG. 3 illustrates an example display 300 as part of a user interface for presenting data related to a lazily evaluated object, in accordance with an aspect of the present invention. The display 300 may be presented to a user in response to an expansion of the LE object, as discussed above with respect to FIG. 2. Thus, in one sequence of events, the display 300 may follow the display 200 of FIG. 2. However, in other sequences of events, the display 300 may occur as a result of a user command in a window other than the display 200.

Elements of the display 300 that are like numbered to those of display 200 have similar characteristics, and the discussion of these elements of display 200 may apply to display 300, unless stated otherwise herein. In display 300, node expansion icon 206e, corresponding to results view node 318, appears in an expanded state, with a minus "−" symbol, to indicate the node is expanded. Results view node 318 corresponds to results view node 216 of FIG. 2. However, results view node 318 as illustrated has associated child nodes 320-328 in the tree hierarchy. Each of child nodes 320-328 represents an enumeration of the LE object 114. Each child node 320-328 indicates that a child element has been evaluated, and the corresponding data determined. Thus, the lazy evaluation, or at least a portion of it, has been performed. It is to be noted that, though the example UI illustrated in FIG. 3 shows five elements of the LE object 114, based on the program logic and the data, an LE object may include any number of elements, from as few as zero elements to an infinite number of elements. In one implementation, if the debugger determines that an LE object has zero elements, it may provide an indication that there are zero elements, such as displaying "<null>" or other text or a symbolic indication.

It is to be noted that, though FIG. 3 illustrates an expanded view of the LE object, the mechanisms described herein may include partial expanded views. For example, in one embodiment, as each element, or enumeration, of the LE object is evaluated, the results are displayed in the display 300. In one embodiment, each element may be evaluated sequentially, and each corresponding value in the child nodes 320-328 may be displayed as the value is retrieved, in sequential order. In one embodiment, two or more enumerations may be evaluated at least partially concurrently, and one or more values may be retrieved and displayed in an order other then sequential order. In one embodiment, the LE object may be completely evaluated prior to displaying any of its elements.

As illustrated in FIG. 3, the values corresponding to each element of the LE object may be displayed in the value field of a respective node. The name field corresponding to each element may show the numeric sequence of the element. Additionally, in the example display 300, each of the child nodes 320-328 is expandable, and an expansion of any node provides detailed data of the element's values.

As discussed above, evaluating an LE object in the debugger may consume a large amount of one or more resources, such as memory or time. One or more resource limitations may be specified by the user or predefined, in order to accommodate this. For example, a user may specify an amount of time that is to be used as a limit when evaluating LE objects. When the specified amount of time is reached, mechanisms of the debugging system may detect an occurrence of a timeout event and cease further evaluations or enumeration and display evaluated data corresponding to the completed iterations. For example, the display 300 of FIG. 3 may represent an evaluation that has been terminated due to a time limitation. In one embodiment, a display such as display 300 that is presented after a termination of the evaluation may include an indication that such a termination occurred, such as text, symbol, graphic, or the like. In one embodiment, a default time limit may be employed if a user does not specify a time limit. In one embodiment, a user may invoke a command to terminate evaluation while the debugger is evaluating an LE object and, in response, the evaluation may be terminated by the debugger. In one implementation, termination of an evaluation may include canceling a thread that is performing the evaluation.

Limits to other resources, such as memory, display space, or other hardware or software resources, may also be specified to cause termination of an LE object evaluation. A debugger may monitor the resource usage during evaluation and terminate if the limit is reached or exceeded. The display 300 may include values for a partial evaluation, such as all iterations that have been performed prior to the termination. In one implementation, a user may specify a metric to limit the evaluation, such as a maximum number of iterations to perform prior to a termination.

In one embodiment, evaluation of an LE object may be terminated due to an exception that occurs. The values retrieved prior to the termination may be displayed, as described above, with a message or other indication of the exception. In one embodiment, an exception may occur while evaluating an iteration, and the debugger may continue other iterations, displaying an indication that the exception occurred for the corresponding iteration.

A user may interact with the debugger showing the display 300 by executing a number of commands. Some of these commands include resuming execution of the debuggee program. Resuming execution of the debuggee program may be invoked by any one of a number of commands, including a single step command or a continue command. Each are briefly described now. As used herein, the term "resume command" refers to a command to continue execution of the debuggee program, and encompasses a single step command or a continue command. The action of resuming a program refers to the action of continuing a program, and may include performing a single step or generally continuing other than a single step. It should be noted that a debuggee program that is in a paused state may resume other than in response to a user command. For example, a program may resume in response to a signal from another process or external device, a timer, or the like.

Single Step. This command instructs the debugger to execute a single step and then break. This command may have several variations. A step may correspond to a single line of source code, which may correspond to one or more lower level instructions. Depending on the current place in the source code, and variations in the single step command, invoking a single step command may cause the program to continue executing through any methods or functions that are called during execution of the single step. It may cause the program to enter a called method or function and break after entering. In another variation, a single step command may cause the program to execute until it exits a current method or function. In other variations, a single step may be measured in a variety of ways, but each includes executing some amount or sequence of instructions and then breaking.

Continue. This command instructs the debugger to execute the debuggee program until a breakpoint, break condition, or exception is reached. A breakpoint may be a location in the program designated by a user, such as a line of source code. A break condition may be an expression that is evaluated repeatedly or at designated points, causing a break if the expression evaluates to be true. In other variations, a break may result from various other conditions or specifications.

Following a resumption of execution and a break, the debugger may pause with a display of the LE object. Depending on the debuggee program logic, one or more of the values corresponding to the evaluation of the LE object may have changed as a result of the program execution. In one embodiment, the debugger may automatically refresh data other than LE objects when the data changes during execution of the debuggee program, or refresh the data when the program breaks. However, automatic refreshing of data may be constrained such that evaluated elements of an LE object are not automatically refreshed during execution or upon a break. Rather, refreshing evaluated elements of LE objects is not performed, and therefore reevaluation is not performed, until a user provides a command to force evaluation and refresh the LE object elements, or a subset thereof. By disabling automatic evaluation and refreshing of an LE object, or disabling the automatic evaluation of the elements, the system may avoid undesirable side effects of evaluation, such as changes to data values, consumption of resources, or a change in the debuggee program flow or results. In one embodiment, disabling of automatic evaluation of LE objects may be controlled by a user, such that the automatic refreshing is selectively performed, based on a user specification or command.

Figure 4:
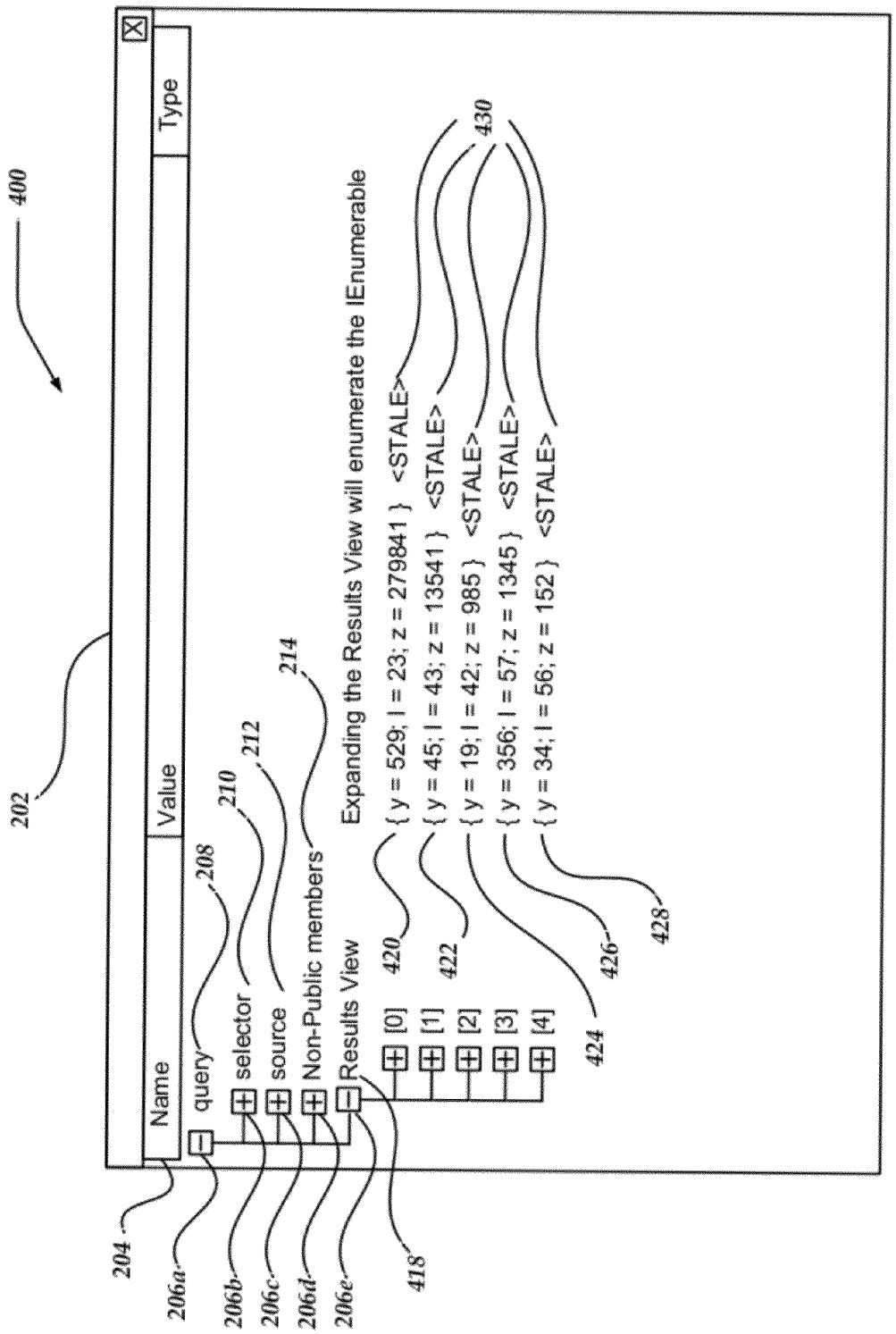
FIG. 4 illustrates yet another example display as part of a user interface for presenting data that may be used in one embodiment of the present invention.

In one embodiment, the display 300 may provide an indication that the values of the evaluated elements are not known to be current. This is referred to as "stale" data values, in which the values may or may not be current, but there is no knowledge of whether they are. FIG. 4 illustrates an example display 400 of a user interface, showing a display 400 containing stale data. Display 400 may be presented to a user in response to a resume operation performed following the display of FIG. 3. Elements of the display 400 that are like numbered to those of display 300 have similar characteristics, and the discussion of these elements of display 300 may apply to display 400, unless stated otherwise herein. In display 400, results view node 418 corresponds to results view node 318, and child nodes 420-428 correspond to child nodes 320-328, of FIG. 3. However, following a resume operation, the results view node 418 displays stale data in the child nodes 420-428. For clarity of illustration, in FIG. 4 stale data is indicated by a symbol 430 containing the text "STALE" in each value field in which a value is stale. However, an indication that the values are stale may be presented by one or more of a number of techniques. In one technique, the color of the text showing the values or other parts of the child node is changed to gray or another color other than the color used to show current values. In other techniques, the text style may be changed to italics, the font or text size may be changed, or other formatting changed. Various symbols or other graphics may also be used to indicate values that are stale.

Figure 5:
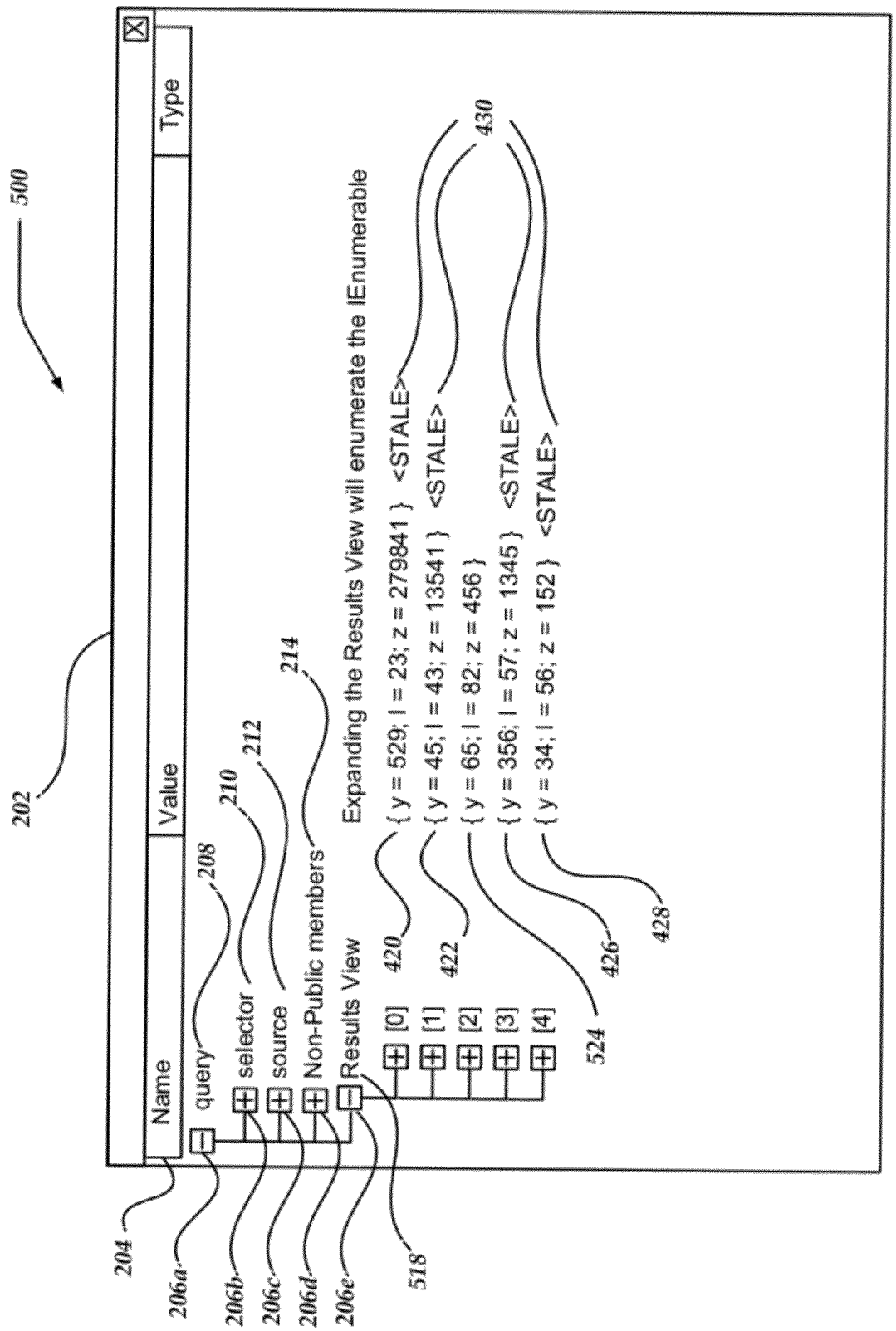
FIG. 5 illustrates still another example display as part of a user interface for presenting data that may be used in one embodiment of the present invention.

In a state where some or all of the evaluated values are stale, a user may cause one or more items to be reevaluated. The user may select one or more items, such as by selecting one or more nodes 420-428 of FIG. 4, corresponding to evaluated elements, and invoke a "refresh" command, such as by clicking on a refresh button or selecting a menu item. In response, the debugger causes the selected elements to be reevaluated, and displays each of the values after reevaluation, removing the indication of being stale for each of the refreshed items. In one implementation, each of the elements prior to the specified elements is enumerated, though the corresponding displayed values are not necessarily refreshed. Thus, if a user knows that evaluation of a certain element may cause unwanted side effects or consume too many resources, the user can exclude that element from being refreshed, while refreshing one or more other elements. In conjunction with reevaluating and displaying a fresh value, the indication that the value is stale may be modified to revert back to a display indicative of fresh data. FIG. 5 illustrates an example display 500 of a user interface, showing a display 500 containing stale evaluated elements and fresh evaluated elements of an LE object. Display 500 may be presented to a user in response to a refresh operation performed following the display of FIG. 4. It shows an updated results view node 518, which corresponds to results view node 418 of FIG. 4. More specifically, following a specification of child node 424 of FIG. 4 and a user command to refresh the corresponding element, child node 524 is shown with the indication of stale data removed. Thus, the mechanisms described herein may selectively indicate, for each evaluated element, whether the display value is stale or fresh, based on a current status of each element.

Figure 6:
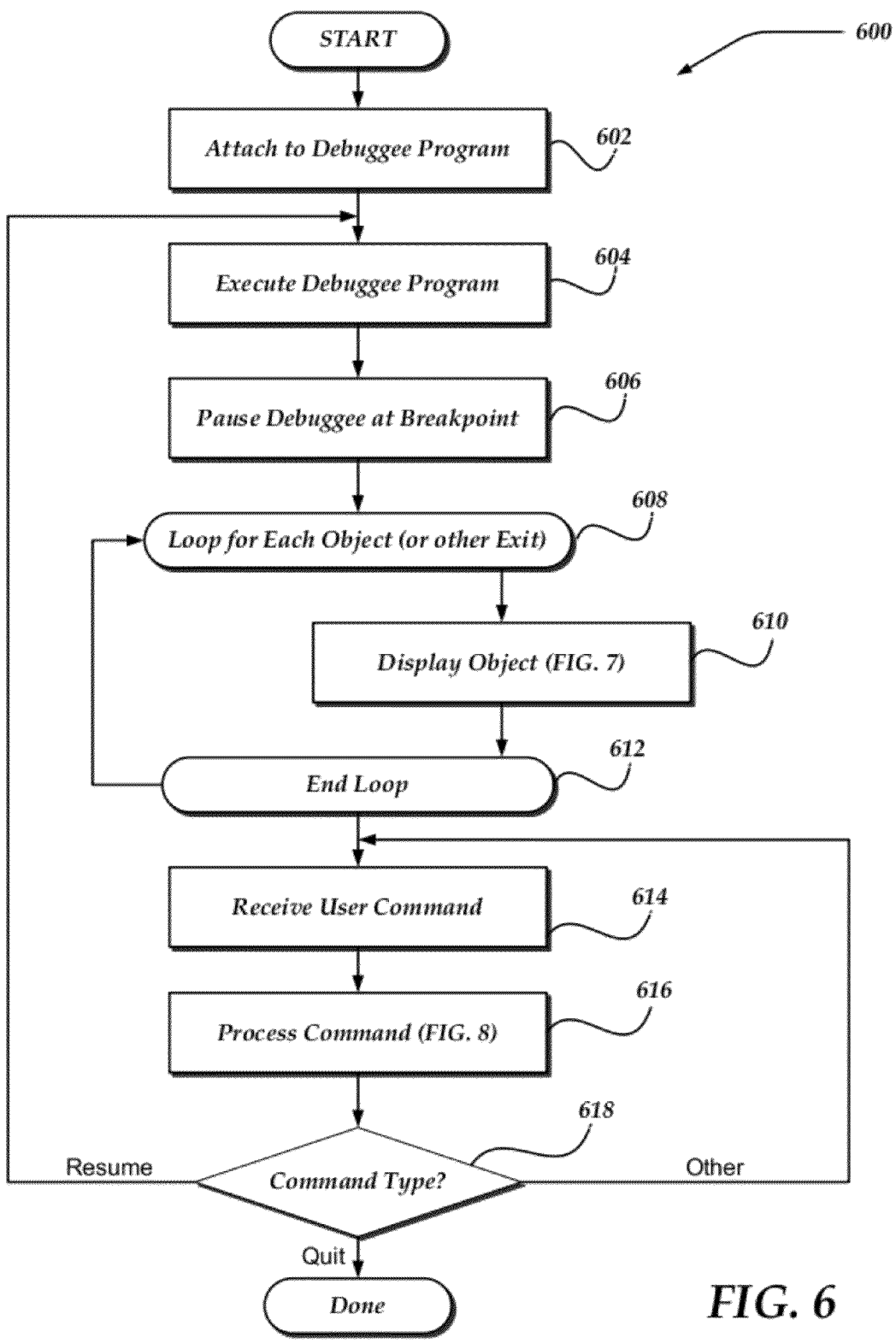
FIG. 6 is a logical flow diagram generally showing a high level view of a process for facilitating debugging of a computer program, in accordance with an embodiment of the present invention.

FIG. 6 is a flow diagram illustrating a process 600 of facilitating debugging of a computer program, such as debuggee program 120 of FIG. 1, in accordance with an embodiment of the invention. Process 600 may employ at least a portion of the system illustrated in FIG. 1. It may employ any of the system variations discussed herein, or it may be performed with other systems. In one embodiment, debugger 108 performs process 600, or a portion thereof, and may employ run-time environment 118 to perform portions thereof.

As illustrated in FIG. 6, after a start block, at block 602, a debugger attaches to a debuggee program. Attaching to a debuggee program may include requesting or receiving various data descriptive of source code, executable instructions, program structure, or data elements. At block 604, a portion of the debuggee program is executed. Components of a run-time environment may be employed to perform this execution.

At block 606, a breakpoint associated with the debuggee program is reached, and execution of the program is paused. The breakpoint may occur as a result any of a number of types of breakpoints. This may include reaching a location in the debuggee program specified by the user, evaluation of a specified break condition to be true, a run-time exception, a break command issued by a user, a signal received by the debuggee program or the debugger, or logic in the debuggee program that causes a break. Upon reaching the breakpoint, execution of the debuggee program is in a paused state.

At block 608, a loop begins in which each object or data element that is in scope is iterated over. In one implementation, the debugger may retrieve a collection of all such objects and iterate over each object. In one implementation, this collection may be limited to those objects that are to be displayed, based on various specifications, the debuggee program, or debugger logic. For example, the collection of objects may be based on debugger windows that are open or objects that are associated with open debugger windows. As a further example, if the only object display windows open are watch windows, then the collection of objects may be limited to objects that are associated with the open watch windows.

At block 610, within each iteration of the loop 608, data associated with an object is displayed. The display may be within a watch window, a general debugger window, or another type of window. In one configuration, at least a portion of the object display may be performed remotely from the debugger 108. The action of displaying an object at block 610 is illustrated in further detail in FIG. 7 and the associated discussion herein.

At block 612, the loop 608 is terminated. This loop may continue until each relevant object is iterated over, or by other process flow as the program logic dictates. For example, in one implementation, the debugger may receive a user command or other signal that causes an early exit of the loop 608. Upon exiting the loop 608, the debugger may be in a state of waiting for user input. Though this is referred to as a state of waiting, the debugger may be performing other actions in this state. Additionally, in some implementations or in some conditions, the process flow may continue without a wait state. For example, a user command, shown in FIG. 6 as being received at block 614, may be received prior to exiting of the loop 608. In one implementation, a user command received prior to exiting of the loop 608 may cause debugger actions concurrently with execution of the loop 608. In other implementations, a user command may cause a premature exiting of loop 608, cause execution of loop 608 to be temporarily blocked, or may be queued for a later action.

At block 614, a user command is received. At block 616, processing of the user command is performed. The user command may be one of a number of commands that a user may employ to control the debugger, view or modify data, or other actions. Processing of a portion of user commands is illustrated in further detail in FIG. 8 and the associated discussion herein.

Process 600 may flow to block 618, where a determination is made of the type of user command that has been received. Though some of the processing in response to the user command may be performed in block 616, the determination of block 618 may provide additional processing to facilitate process flow related to process 600. In one implementation, the determination of block 618 may be based on a return value of a method or function invoked to perform processing of the user command at block 616.

If, at block 618, it is determined that the user command includes a resume command, process 600 may flow to block 604, where execution of the debuggee program is performed. Execution may resume at a location based on a current state of the debuggee program, a user specified location, or other logic or specifications. As discussed herein, a resume command may include a single step command, a continue command, or other types of commands to continue execution of at least a portion of the debuggee program.

If, at block 618, it is determined that the user command is a quit command, process 600 may flow to a done block, where control may return to a calling program. This action may include freeing or deallocating memory or other resources, logging information, or other termination operations.

If, at block 618, it is determined that the user command is a type of command other than a resume or quit command, process 600 may flow to just prior to block 614, where the debugger is in a state waiting for another user command, as discussed above.

Figure 7:
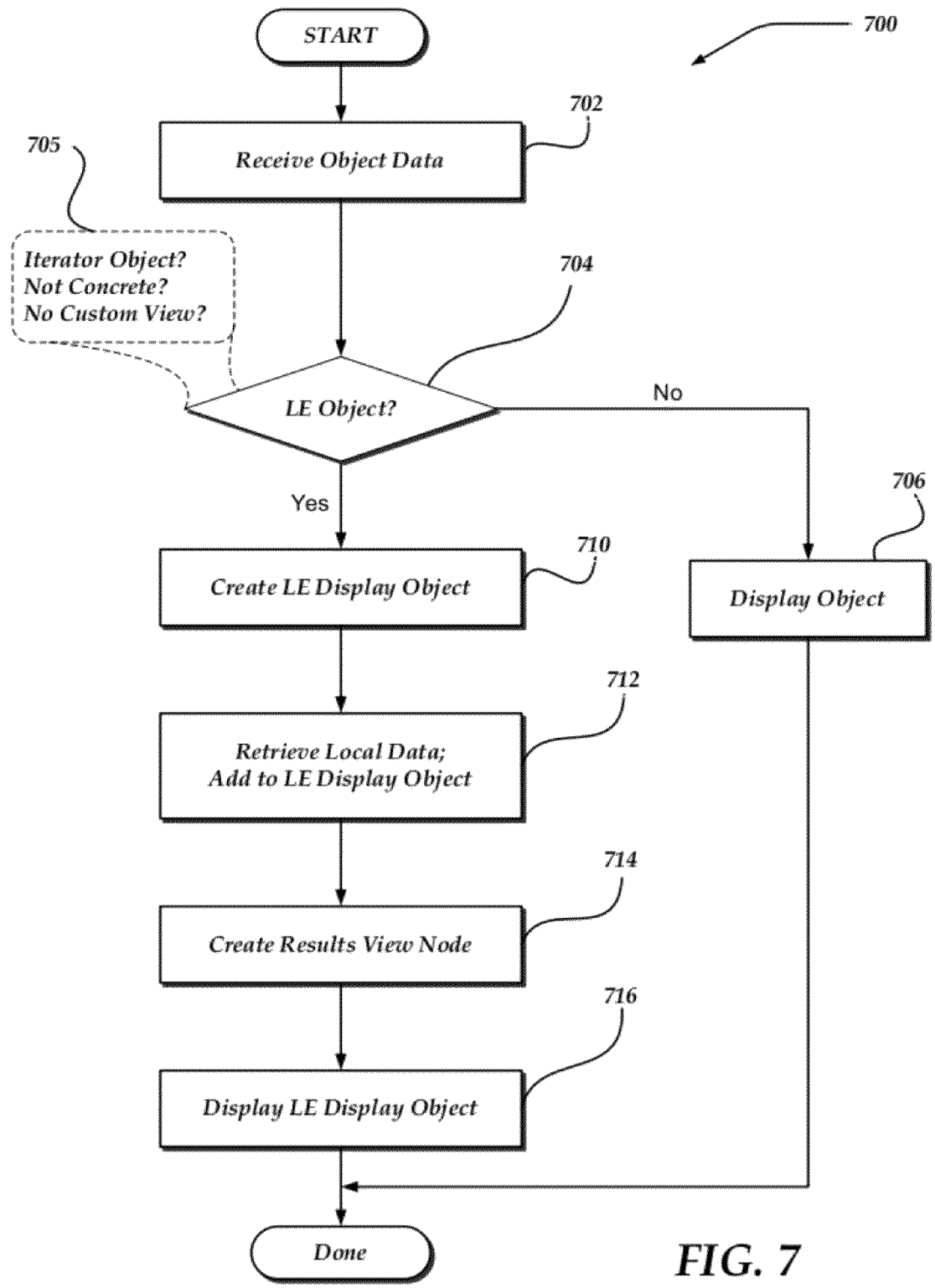
FIG. 7 is a logical flow diagram generally showing aspects of a process for facilitating debugging of a computer program, in accordance with an embodiment of the present invention.

FIG. 7 is a flow diagram illustrating a process 700 of displaying a program object, in accordance with an embodiment of the invention. Process 700, or a portion thereof, may be performed by debugger 108 of FIG. 1. Actions of process 700 may be performed as part of the actions of block 610 of FIG. 6.

At block 702, data associated with a program object may be received. This may occur in response to a request to examine the object. For example, debugger 108 may send a request to debuggee 120 for data describing the object, such as variables, members, types, classes, implemented methods or interfaces, or the like. Debugger 108 may send a request to run-time environment 118 for data describing the object's current status, contents of local variables, or the like. In response, debuggee 120 or run-time environment 118 may send requested information to the debugger.

The process may flow to block 704, where a determination may be made of whether the program object is an LE object. This determination may be based on object information received from the debuggee program 120. In one embodiment, this determination may be based on semantics of the programming language employed to implement the debuggee program, implementations of a compiler used to compile the debuggee program, or logic that the debugger may employ to characterize aspects of the program object. As illustrated in the discussion that follows, in some embodiments, the determination of block 704 may exclude some LE objects based on user specification or predefined program logic. Therefore, the determination of block 704 may be characterized as a determination of whether the object is an LE object and it is desirable to provide a delayed evaluation interface to a user. As used herein, the terminology of determining whether an object is an LE object is intended to include such implementations.

The determination of whether an object is an LE object may include one or more tests, or determinations. As illustrated by block 705, in one embodiment, three such tests may be performed. One test is whether the object has an associated user-defined or other provided debug display customization. For example, in one embodiment, a debug proxy object may be associated with the object to provide instructions for displaying the object in a debugger. In one implementation, an object having an associated debug display customization, such as a debug proxy, is excluded from being considered an LE object at block 704. In one implementation, an object that has an associated debug display customization, such as a debug proxy, may be considered an LE object at block 704, and mechanisms of the invention may be used in conjunction with debug display customizations.

Another test that may be used is whether the object is an iterator object. In some implementations, this test may consider whether the object is an iterator object, implements an iterator pattern, or implements an interface that provides enumeration methods. For example, in the C# language, the IEnumerable interface is used to implement an iterator object. Therefore, if the debuggee program employs the C# language, this test may evaluate whether the object's class implements the IEnumerable interface. Other languages may employ a similar interface or class methods to implement iterator objects. In such cases, this test may consider analogous object attributes.

A third test that may be used in the determination of block 704 is whether the object is a concrete collection. As discussed elsewhere herein, in a concrete collection, the object includes the data itself, rather than a pattern indicating how the data is to be retrieved. Concrete collections are not considered to have lazy evaluation, and are therefore excluded from characterization as an LE object.

Though three tests are described herein, various implementations of the determination of block 704 may use two, one, or none of these tests, or may use one or more other tests. For example, in one implementation, a method return value, an implemented interface, or other characteristics of an object may indicate whether an object is to be considered an LE object by the debugger, either by itself or in combination with other tests. In one implementation, an object of a particular class or implementing a particular interface may be considered to include or exclude an object from characterization as an LE object. The determination of block 704 may be configured to employ any one or more of a variety of such tests.

If, at block 704, it is determined that the object is not an LE object, the process flow may proceed to block 706, where the object is displayed. This display may employ known techniques, and are not described herein. Though not illustrated in FIG. 7, displaying an object may include displaying each of its member objects. In some implementations, this may be performed by invoking process 700 recursively. If a non-LE object has one or more member objects that are LE objects, each of these member LE objects may therefore be handled in a manner as described by the actions of blocks 710-716. In one implementation, members of an object are displayed as child nodes of the object in a hierarchical display. Therefore, an LE object may be displayed as a child node of a non-LE object. After displaying the object, the process may flow to a done block where the process returns to a calling program.

If, at block 704, it is determined that the object is an LE object, the process may flow to block 710, where an LE display object corresponding to the LE object may be created for display in a debug window. In one implementation, the LE display object may be a child node of a parent display object used to display debug objects in a hierarchical user interface. As illustrated in FIG. 2, the LE display object (represented by nodes 208-216) may include one or more expandable nodes having corresponding node expansion icons indicate the nodes are expandable. One or more of the nodes may correspond to local data of the LE object.

The process 700 may flow to block 712, where local data corresponding to the LE object is retrieved for display. This action may include adding the local data to the LE display object described above. In one configuration, a debug proxy may be used to perform the actions of retrieving and displaying local data of the LE object.

The process 700 may flow to block 714, where a results view node is created. This node corresponds to the delayed evaluation data of the LE object. As illustrated in FIG. 2, a results view node 216 may include a delayed evaluation notice indicating, to a user, events that may occur upon evaluation of the LE object. Also, as illustrated in FIG. 2, the results view node may appear initially in an unexpanded state.

The process 700 may flow to block 716, where the LE display object is displayed. FIG. 2 provides an example of an LE display object as it may appear in a debug window.

In one implementation, the process 700 may employ a display proxy associated with the LE object to display data associated with the LE object. The process may receive data from the display proxy and use the received data to display the LE display object. In one implementation, the debugger may create an instance of the display proxy.

It is to be noted that the sequence of actions of process 700 may vary in different implementations or even between executions of an implementation. Specifically, the sequence of creating components of an LE object, inserting data into the object, and displaying the object may vary, and some actions may be performed concurrently. For example, portions of the LE display object may be displayed before other portions are created or before all data is inserted into the object. The sequence illustrated and described herein is for illustrative purposes, and is not to be considered as limiting the mechanisms discussed herein.

Figure 8:
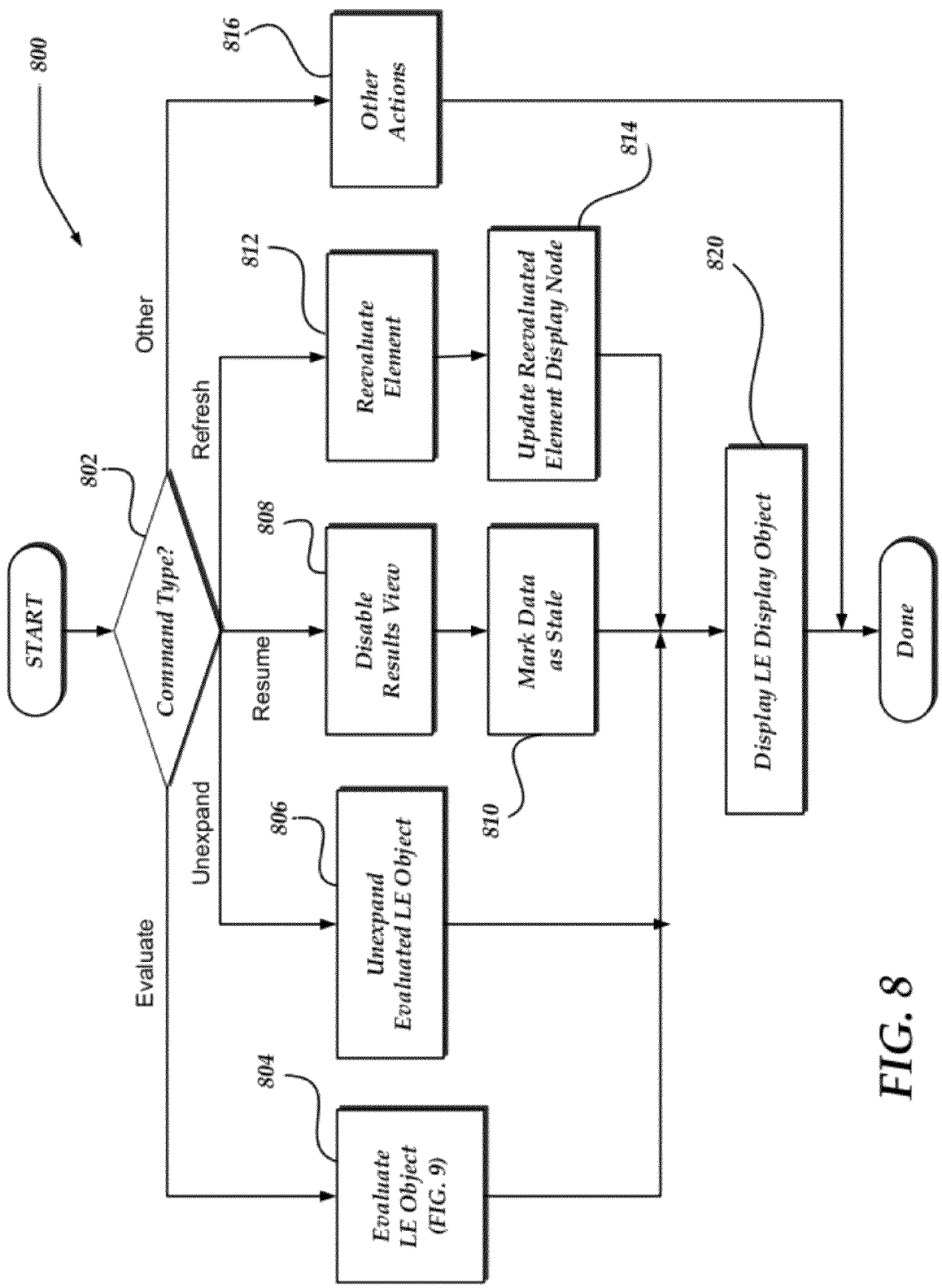
FIG. 8 is a flow diagram generally showing a process for processing a command, in accordance with an embodiment of the present invention.

FIG. 8 is a flow diagram illustrating a process 800 of processing a command, in accordance with an embodiment of the invention. At least a portion of process 800 may be performed by debugger 108 of FIG. 1. Actions of process 800 may be performed as part of the actions of block 616 of FIG. 6.

Figure 9:
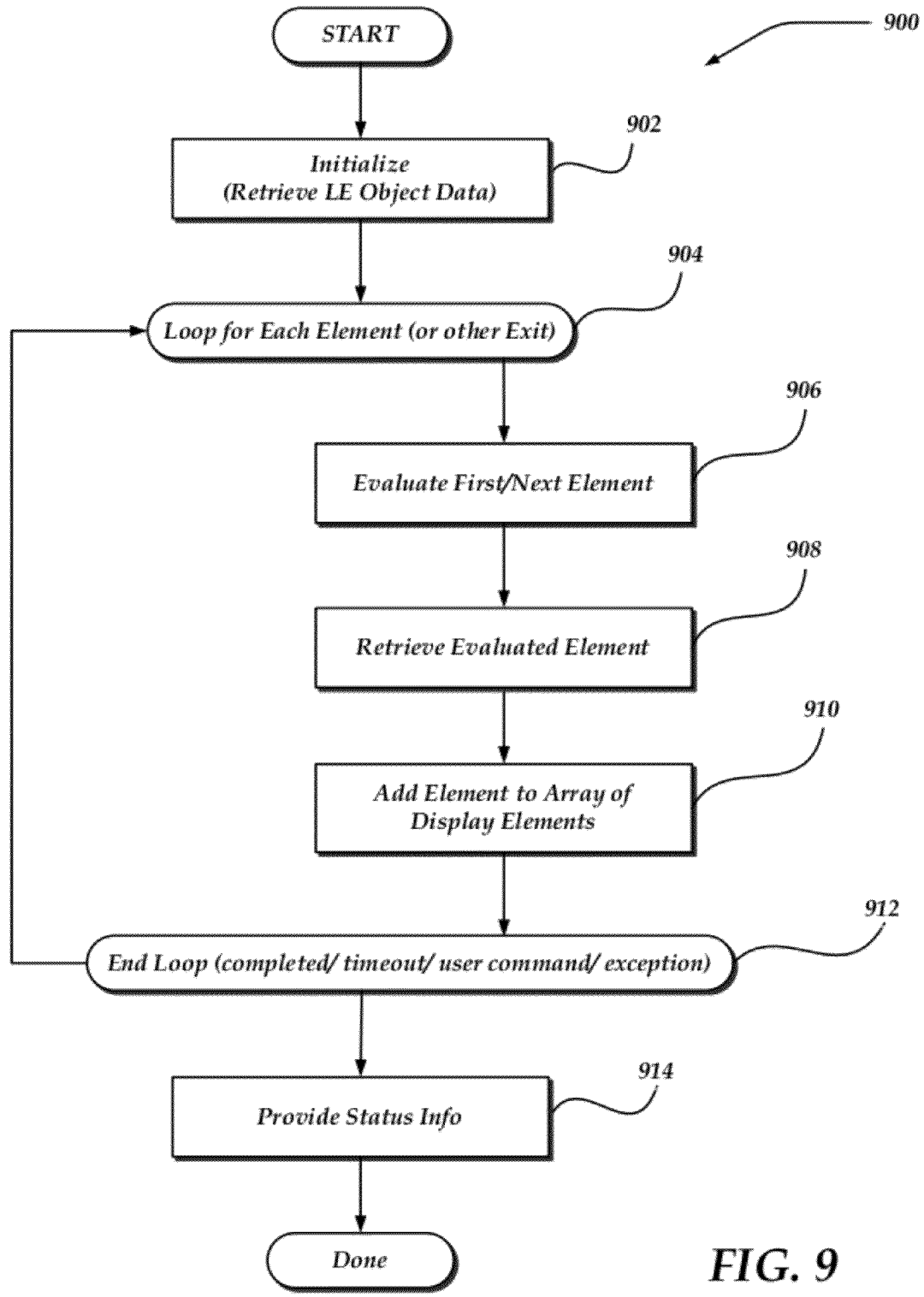
FIG. 9 is a flow diagram generally showing a process of evaluating an object, in accordance with an embodiment of the present invention.

At block 802, a determination is made of the type of command to be processed. Based on the determination of block 802, the process may flow to one of a number of action blocks. If, at block 802, it is determined that the command is a command to evaluate the LE object, the process may flow to block 804, where elements of the LE object are evaluated, and corresponding nodes are added to a display. Further details of these actions are illustrated in FIG. 9, and discussed elsewhere herein. The process may flow to block 820, where at least a portion of the LE Display Object is displayed, and the newly added display nodes are displayed in a debug window. It is to be noted that the sequence of actions may vary. In one implementation, each node is displayed after the corresponding element is enumerated.

The process may then flow to a done block, where the process may return to a calling program, or repeat for another received command.

If, at block 802, it is determined that the command is a command to unexpand a node corresponding to an evaluated LE object, the process may flow to block 806, where the evaluated LE object node is unexpanded, and display nodes corresponding to each element of the LE object are hidden. In one implementation, this may include marking each node as a hidden node so that it is not displayed, though in various implementations this may be performed in a variety of ways. The process may then flow to block 820, where the LE display object is redisplayed, or the display window updated in another manner to show the LE display object in an unexpanded view. For example, in the display 300 of FIG. 3, clicking on the results view node expansion icon 206e may invoke an unexpand command. The resultant display may appear similar to the example display of FIG. 2.

If, at block 802, it is determined that the command is a command to resume execution of a debuggee program, the process may flow to block 808, where actions are taken corresponding to this command. As discussed elsewhere herein, resuming a program encompasses single stepping, continuing, or other actions of resuming execution of a debuggee program. At block 808, the results view corresponding to the LE object is disabled in all associated debug windows. In FIG. 3, the results view corresponds to the results view node 318 and associated child nodes 320-328. Disabling a results view node prevents the node from being updated automatically during debuggee program execution or at a subsequent breakpoint. It does not, however, prevent evaluation of the LE object in response to a user command to force evaluation of the LE object. Disabling the results view node enables the system to avoid undesirable resource usage or evaluation side effects, without an explicit user command.

The process may flow to block 810, where the child nodes corresponding to each evaluated element of the LE object are marked as stale. As discussed elsewhere herein, a stale element may be indicated in the user interface by a variety of techniques, such as using gray or another color when displaying text, using other formatting changes, symbols, or graphics.

The process may then flow to block 820, where the LE display object is redisplayed, showing any indications of stale data. FIG. 4 illustrates an example display 400 that may be presented to the user by the actions of block 820, the display having child nodes 420-428 representing stale data.

In one embodiment, the system may be configured to not perform the actions of blocks 808 and 810 disabling the results view node and marking the element nodes as stale. For example, a user may specify that disabling of a specified results view node is to be overridden, thereby instructing the debugger to automatically evaluate LE objects that are displayed during debuggee program execution or upon reaching a breakpoint. In one implementation, a user may specify one or more individual enumerations of an LE object for which automatic refreshing is to be performed.

The process may then flow to a done block, where the process may return to a calling program, or repeat for another received command. As illustrated in FIG. 6, a resume command may result in a process flow that resumes execution of the debuggee program.

If, at block 802, it is determined that the command is a command to refresh a specified enumerated element of an LE object, the process may flow to block 812, where an expression corresponding to the specified element may be reevaluated. A user may, for example, move a pointer to the desired element and then enter a command to instruct the debugger to refresh the desired element. In one embodiment, the debugger may reevaluate the LE object from the first enumerated element up to the specified enumerated element. At block 812, the debugger may perform the enumeration and expression evaluation action. In one configuration, the expression evaluator 110 of FIG. 1 may perform at least a portion of the enumeration and expression evaluation.

The process may flow to block 814, where a display node corresponding to the evaluated element is updated with data to reflect the evaluation, for example a new value in the value field. The updated node may also be marked as fresh, or not stale. When the node is redisplayed, it may appear as fresh, even though nodes corresponding to other elements may be displayed as having stale values. FIG. 5 illustrates an example display 500 that may be presented to the user by the actions of block 814, the display having child nodes 420, 422, 426 and 428 representing stale data, and child node 524 representing fresh data. The process may then flow to block 820, where at least a portion of the LE display object, and in particular the reevaluated display node, is redisplayed, showing the updated value, and indicating that the updated data is fresh.

If, at block 802, it is determined that the command is a command other than the commands discussed above, the process may flow to block 816, where actions corresponding to the command are performed. For example, in response to a command to set a timeout period, the debugger may set the timeout period to a specified value. In response to add or remove an LE object to a watch window, the debugger may perform the corresponding actions. Some commands may cause a redisplay of the LE object or the display window.

Though FIG. 8 illustrates a number of user commands and corresponding actions, it is to be understood that this is not indicative of the commands that are presented to a user at any one time. For example, the commands to evaluate an LE object and to unexpand an evaluated LE object may be presented as a toggle, such that at most one command is available with respect to a particular LE object. Other commands may be limited by the current state or configuration of the debugger or the debuggee program.

FIG. 9 is a flow diagram illustrating a process 900 of evaluating an LE object, and updating an associated display, in accordance with an embodiment of the invention. At least a portion of process 900 may be performed by debugger 108 of FIG. 1. Actions of process 900 may be performed as part of the actions of block 804 of FIG. 8.

At block 902, initialization actions may be performed. Initialization may include retrieving data associated with the LE object to be evaluated. For example, data descriptive of the LE object may be retrieved from a debuggee program such as debuggee 120, or associated run-time data may be retrieved from a run-time system, such as run-time environment 118. Initialization may also include retrieving an associated LE display object for displaying evaluated elements.

Processing may flow to block 904, where a loop begins, the loop evaluating each element of the LE object and iterating over each element. The process may flow to block 906, where the next element is enumerated. The first time this action is performed, the next element is the first element. Enumeration of an element may include evaluating an expression corresponding to the enumeration, as specified by the logic of the LE object. For example, this may include performing a calculation, executing a query, allocating a resource, or various other actions. In some configurations, executing a query at block 906 may include sending a command or request to one or more remote devices, such as servers 1008-1012 of FIG. 10. In one configuration, the expression evaluator 110 of FIG. 1 may perform at least a portion of the expression evaluation. At block 908, the enumerated element is retrieved.

The process may flow to block 910, where a node corresponding to the element is added to the LE display object associated with the LE object. The node may be a child node of the LE display object. Child nodes 320-328 of FIG. 3 are examples of LE display object child nodes corresponding to elements of an LE object that may be added by the actions of block 910. In the illustrated example, each child node has a set of values that is displayed in the value field. Though not illustrated in FIG. 9, an element of an LE object may itself be an LE object, or may have an LE object as a descendent. In one implementation, evaluation of an LE object does not automatically include evaluation of its evaluated elements that are LE objects; each such child LE object is presented as a non-expanded child node, and may be evaluated upon a command from a user. In one embodiment, a user may enter a command to force evaluation of an LE object and to recursively evaluate child LE objects.

The process may flow to block 912, where the loop beginning at block 904 is terminated. The loop may flow back to block 904, or may exit. Process flow may exit the loop for a number of reasons. If the evaluation of the LE object is complete, the loop may exit due to a completed evaluation. The loop may exit in response to a timeout that has occurred. If a user command, such as a cancel command, has been entered, or if a signal has been received that warrants exiting, the loop may exit. Other events, such as an exception, may also trigger an exiting of the loop. An evaluation that results in zero elements may be considered as a special case of a completed evaluation or it may be considered to be an exception.

The process may flow back to block 904, to repeat the loop. If the loop exits, the process may flow to block 914, where status information indicative of the process outcome is provided to a calling program or other component. The status information may indicate any of the reasons for exiting described above, or other status information. Status information may be used by a display component, in order to indicate to a user a status; for example that a displayed list of elements is incomplete. The process may flow to a done block where control may return to a calling program.

In one implementation, actions of evaluating an LE object and retrieving the evaluating the data may be performed without employing a looping logic. For example, an LE object may be a deferred query with a result that does not require enumeration. A node representing the query results may be added to the display as a child of the LE object. The display may appear similar to an enumerable LE object that has one enumerated element.

FIG. 10 illustrates an exemplary environment 1000 within which embodiments of the invention may be practiced. Environment 1000 includes a computing device 1002, which may correspond to computing device 106 of FIG. 1, and may have all or a portion of the components of computing device 106 as described herein. Computing device 1002 may contain development environment 104, and may also contain debuggee program 120. Computing device 1002 may include or communicate with display 1004. Display 1004 may receive and display data from user interface 112 or other components of debugger 108. Computing device 1002 may include or communicate with a keyboard, pointing device, or other I/O components (not shown), each of which may be employed by a user of the development environment.

In one configuration, output of the debuggee program 120 may be displayed on a second display 1006. In one configuration, output of the debuggee program 120 is displayed on the same display as that used by the debugger 108, such as display 1004.

Environment 1000 illustrates a local server 1008 communicating with computing device 1002 by a direct connection or over a local network. Servers 1010 and 1012 communicate with computing device 1002 over a wide area network, such as the Internet 1014. In some configurations, a query used to evaluate LE objects may be directed to one or more remote computing devices, such as servers 1008-1012.

Each of servers 1008, 1010, or 1012 may perform evaluations of deferred expressions, as indicated by instructions of a LE object, such as LE object 114. These evaluations may include computations to generate a response, accessing a data store, or communication with additional servers. For example, server 1010 may include or communicate with a database 1014 that is queried by LE object 114. Server 1012 may include a search engine, web site or other data depository that is queried by LE object 114. Communication with any of servers 1008, 1010, or 1012 may use any one or combination of wired or wireless technologies, some of which are described herein. Any of a variety of query and communication protocols may be employed to communicate with, and retrieve data from, servers 1008-1012. In addition to the exemplary environment 1000, the invention may be practiced in a number of variations of environment configurations.

It will be understood that each block of the flowchart illustrations of FIGS. 6-9, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A method of facilitating debugging of a computer program, comprising:
    a) executing a portion of the computer program having a program component;
    b) determining whether the program component is a lazily evaluated component; and
    c) if the program component is determined to be a lazily evaluated component, performing the actions of:
        displaying a first representation of the program component representative of a deferred evaluation;
        receiving a user command to evaluate the program component;
        in response to receiving the user command to evaluate the program component, evaluating at least one element of the program component and displaying a second representation of the program component including a representation of the at least one element of the program component; and
        after displaying the second representation of the program component, resuming execution of the portion of the computer program and disabling an automatic evaluation of the at least one element of the program component.

2. The method of claim 1, further comprising selectively terminating the evaluation of the at least one element of the program component based on an occurrence of a timeout.

3. The method of claim 1, wherein determining whether the program component is a lazily evaluated component is based on at least one of determining whether the program component is an iterator object, determining whether the program component is a concrete collection, or determining whether the program component has an associated display proxy.

4. The method of claim 1, wherein: a) displaying the first representation of the program component comprises displaying a results view node as an expandable node in a hierarchical display structure; and b) displaying the second representation of the program component comprises displaying the at least one element of the program component as at least one child node of the results view node.

5. The method of claim 1, further comprising in response to receiving a user refresh command and a specification of an element of the at least one element of the program component, evaluating the specified element and updating at least a portion of the representation of the at least one element of the program component corresponding to the specified element.

6. The method of claim 1, further comprising for each element of the at least one element of the program component, selectively providing an indication that data corresponding to the element is stale.

7. The method of claim 1, wherein displaying the first representation of the program component employs a debug proxy associated with the program component.

8. A computer readable medium having stored thereon computer executable instructions for performing the method of claim 1.

9. A system for facilitating debugging of a computer program, comprising:
    a) a user interface component;
    b) a debugger that is configured to perform actions, including:
        i. receiving data associated with a program component of the computer program; and
        ii. if the program component specifies a deferred evaluation:
            displaying a portion of data associated with the program component;
            receiving a user command to perform the deferred evaluation;

in response to receiving the user command to perform the deferred evaluation, performing at least a portion of the deferred evaluation and displaying additional data representative of the deferred evaluation; and after displaying the additional data representative of the deferred evaluation, in response to a resume command, executing at least a portion of the computer program and providing an indication that the additional data representative of the deferred evaluation includes stale data; and c) one or more processors for implementing the debugger.

10. The system of claim 9, the actions further comprising selectively terminating performing the at least a portion of the deferred evaluation based on a user command.

11. The system of claim 9, the actions further comprising selectively terminating performing the at least a portion of the deferred evaluation based on an occurrence of a timeout.

12. The system of claim 9, the actions further comprising determining whether the program component specifies a deferred evaluation at least partly based on whether the program component is an enumerable object.

13. The system of claim 9, the actions further comprising displaying the portion of the data associated with the program component and the additional data representative of the deferred evaluation in a hierarchical interface, the additional data representative of the deferred evaluation presented at a lower level of the hierarchical interface than the portion of the data associated with the program component.

14. The system of claim 9, wherein performing the at least a portion of the deferred evaluation comprises sending, to a remote computing device, a command to perform a query.

15. A system for facilitating debugging of a computer program, comprising:

a) a user interface that displays data associated with an object at a breakpoint in the computer program;

b) evaluation means for:

i. determining whether the object has associated instructions that perform a deferred evaluation, the evaluation means for determining whether the object has associated instructions that perform a deferred evaluation is based on at least one of determining whether the object is an iterator object, determining whether the object is a concrete collection, or determining whether the object has an associated display proxy; and ii. if the object has associated instructions that perform a deferred evaluation:

receiving a user command to perform the deferred evaluation; and in response to receiving the user command to perform the deferred evaluation, performing the deferred evaluation, the evaluation means comprising at least one processor; and c) means for presenting data obtained from performing the deferred evaluation.

16. The system of claim 15, the means for presenting data selectively indicates that elements of the presented data are stale.

17. The system of claim 15, wherein the means for presenting data, in response to obtaining zero elements, provides an indication that zero elements have been obtained.

18. The system of claim 15, wherein the user interface displays the data in one or more nodes of a hierarchical structure including a results node representative of results of the deferred evaluation, the evaluation means performs the deferred evaluation in response to a user command to expand the results node, and the means for presenting data presents the data in at least one child node of the results node.

\* \* \* \* \*